United States Patent
You et al.

(10) Patent No.: US 10,399,490 B2
(45) Date of Patent: Sep. 3, 2019

(54) PEDESTRIAN WARNING SYSTEM AND METHOD FOR ECO-FRIENDLY VEHICLE

(71) Applicants: Hyundai Motor Company, Seoul (KR); Kia Motors Corporation, Seoul (KR)

(72) Inventors: Jung Keun You, Suwon-si (KR); Mun Hwan Cho, Seoul (KR); Jin Mo Lee, Uiwang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/831,738

(22) Filed: Dec. 5, 2017

(65) Prior Publication Data

US 2019/0001881 A1    Jan. 3, 2019

(30) Foreign Application Priority Data

Jun. 30, 2017  (KR) ........................ 10-2017-0083357

(51) Int. Cl.
| | | |
|---|---|---|
| B60Q 1/068 | (2006.01) | |
| B60Q 5/00 | (2006.01) | |
| B60Q 9/00 | (2006.01) | |
| G10K 15/02 | (2006.01) | |

(52) U.S. Cl.
CPC ............. *B60Q 5/008* (2013.01); *B60Q 9/008* (2013.01); *G10K 15/02* (2013.01); *B60Y 2306/11* (2013.01)

(58) Field of Classification Search
CPC ........ G10K 15/02; B60Q 5/008; B60Q 9/008; B60Q 1/2611
See application file for complete search history.

(56) References Cited

U.S. PATENT DOCUMENTS

| | | |
|---|---|---|
| 9,079,499 B1 | 7/2015 | Raubvogel |
| 2013/0076504 A1 | 3/2013 | Nakayama |
| 2013/0249680 A1 | 9/2013 | Goto |
| 2015/0165968 A1* | 6/2015 | Kim ...................... B60Q 5/008 381/86 |
| 2016/0229340 A1* | 8/2016 | Sakakibara ............ B60Q 5/008 |
| 2017/0001558 A1 | 1/2017 | Kwon |
| 2017/0096099 A1 | 4/2017 | Matsubara |

* cited by examiner

*Primary Examiner* — Munear T Akki
(74) *Attorney, Agent, or Firm* — Morgan, Lewis & Bockius LLP

(57) ABSTRACT

A pedestrian warning system for an eco-friendly vehicle may include a warning sound controller including an alarm sound controller and a virtual engine sound system configured to inform a pedestrian of a behavior of the vehicle; and an alarm sound output device including not only an amplifier for amplifying a pedestrian alarm sound and a virtual engine sound, but also a directional speaker for outputting the amplified pedestrian alarm sound and the amplified virtual engine sound.

9 Claims, 7 Drawing Sheets

PEDESTRIAN WARNING SYSTEM AND METHOD FOR ECO-FRIENDLY VEHICLE

CROSS REFERENCE(S) TO RELATED APPLICATIONS

The present application claims priority to Korean Patent Application No. 10-2017-0083357, filed on Jun. 30, 2017, the entire contents of which is incorporated herein for all purposes by this reference.

BACKGROUND OF THE INVENTION

Field of the Invention

The present invention relates to a pedestrian warning system and method for an eco-friendly vehicle, and, more particularly, the present invention relates to a pedestrian warning system and method for an eco-friendly vehicle wherein, when an electric or hybrid vehicle is driven by a motor, the pedestrian warning system and method can allow an in-vehicle speaker to generate an alert sound or virtual engine sound to inform a pedestrian of movement or behavior of the electric or hybrid vehicle wherein the pedestrian can recognize the presence of the electric or hybrid vehicle.

Description of Related Art

An electric vehicle (EV) driven using only electrical energy produced by an electric motor, a plug-in hybrid electric vehicle (PHEV), and a hybrid electric vehicle (HEV) are characterized in that noise generated by an internal combustion engine may not occur, such that there is a high risk of a pedestrian collision.

To avoid pedestrian collision, a pedestrian collision avoidance apparatus configured to generate virtual engine noise by mounting a speaker to an electric vehicle has recently been developed, and the pedestrian collision avoidance apparatus is referred to as a Virtual Engine Sound System (VESS). A VESS mounted to each of hybrid vehicles sold in domestic markets is designed to operate at a low speed of 20 km/h or less.

Recently, the United Nations Economic Commission for Europe Working Party on the Construction of Vehicles (UNECE/WP29) is conducting intensive research into mandatory VESS in all electric vehicles to establish detailed operation regulations of VESSes. The mandatory VESS regulations established by UNECE/WP29 are scheduled to be applied only to new-model vehicles by 2019, and will also be extended to all electric vehicles and all hybrid vehicles by 2021.

In the meantime, the National Highway Traffic Safety Administration (NHTSA) is conducting intensive research into mandatory rules in which an electric vehicle driven at 30 km/h or less is obliged to generate a special warning sound or engine sound, and the mandatory rules are under discussion for introduction in 2018.

As described above, many countries are conducting intensive research into strict regulations for protecting pedestrians located in the vicinity of quiet vehicles including hybrid and electric vehicles, such that development of a Virtual Engine Sound System (VESS) associated with the strict regulations is needed. Furthermore, hybrid vehicles, fuel-cell electric vehicles, and electric vehicles have been developed and rapidly come into widespread use according to eco-friendly/fuel-efficiency priority policies. When eco-friendly vehicles are in an engine-OFF state, it is necessary for pedestrians located adjacent to the eco-friendly vehicles to recognize the presence of the eco-friendly vehicles.

Nowadays, a general magnet speaker mounted to the front of a bumper of the eco-friendly vehicle has been used for VESS implementation. In the present case, sound generated from the magnet speaker is directed only in a specific direction such that pedestrian safety is difficult to guarantee. To address the above-mentioned issues, many developers and companies are conducting intensive research into a pedestrian protection method for disposing one or more vibration elements in an engine compartment of the vehicle and allowing sound to be evenly dispersed in all directions to guarantee pedestrian safety in all directions.

However, to implement the above-mentioned VESS, at least 6 speakers are required within each vehicle, resulting in increased production costs of the vehicle.

Therefore, new methods and apparatuses for allowing pedestrians to easily recognize the presence of quiet eco-friendly vehicles need to be developed at reasonable costs.

The information disclosed in this Background of the Invention section is only for enhancement of understanding of the general background of the invention and should not be taken as an acknowledgment or any form of suggestion that this information forms the prior art already known to a person skilled in the art.

BRIEF SUMMARY

Various aspects of the present invention are directed to providing a pedestrian warning system and method for an eco-friendly vehicle that substantially obviates one or more problems due to limitations and disadvantages of the related art.

Various aspects of the present invention are directed to providing a pedestrian warning system and method for an eco-friendly vehicle, which can implement a cost-efficient Virtual Engine Sound System (VESS), resulting in a reduction of production costs of the VESS.

Various aspects of the present invention are directed to providing a pedestrian warning system and method for an eco-friendly vehicle, which can allow pedestrians located in the vicinity of a traveling road of a quiet eco-friendly vehicle to easily recognize the presence of the quiet eco-friendly vehicle.

Various aspects of the present invention are directed to providing a pedestrian warning system and method for an eco-friendly vehicle, which can provide a pedestrian with a warning signal for indicating that the eco-friendly vehicle will soon turn right to avoid pedestrian collision, resulting in avoidance of traffic accidents.

Various aspects of the present invention are directed to providing a pedestrian warning system and method for an eco-friendly vehicle, which can detect the presence of a pedestrian and generate a warning sound toward a specific region or direction to prevent noise pollution on roads. In more detail, assuming that a VESS mandatory for the eco-friendly vehicle has to generate a loud sound, people may suffer from noise pollution, such that the above pedestrian warning system and method can prevent noise pollution on roads.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance for the invention, as embodied and broadly described herein, a pedestrian warning system for an eco-friendly vehicle may include a warning sound controller including an alarm sound controller and a virtual engine sound system configured to inform a pedestrian of a behavior of the vehicle; and an alarm sound output device including an amplifier for amplifying a pedestrian alarm sound and a virtual engine sound, and a directional speaker for outputting the amplified pedestrian alarm sound and the amplified virtual engine sound, wherein the directional speaker is mounted to a right side of the vehicle, and adjusts an emission pattern of the pedestrian alarm sound and the virtual engine sound according to regional sound field control.

The alarm sound controller may include a right-turn alarm sound controller configured to inform the pedestrian of a right-turn action of the vehicle; and a pedestrian alarm sound controller configured to inform the pedestrian of an approach of the vehicle.

The right-turn alarm sound may be a pattern sound having an emission angle of 60° tilted to a right side with respect to a forward direction of the vehicle.

The right-turn alarm sound may be generated when a combination lever switch of the vehicle moves to a right-turn direction and a steering wheel rotates to a right-turn angle.

The right-turn alarm sound may be generated when a navigation system of the vehicle displays a right-turn signaling message on a traveling route of the vehicle.

The alarm sounds may be generated to have different sound field patterns.

Each of the alarm sound controller and the warning sound output device may include an Automotive Audio Bus (A2B) interface.

The pedestrian warning system may further include a device configured to collect noise signals generated from outside of the vehicle; and an analog-to-digital converter (ADC) configured to convert the collected noise signals into a digital signal.

The warning sound output device may further include an induction tube configured to guide an output sound of the directional speaker in a specific direction thereof In accordance with another aspect of the present invention, a pedestrian warning method for an eco-friendly vehicle may include outputting a virtual engine sound when the vehicle travels at a speed which is equal to or less than a first speed; outputting an alarm sound for informing a pedestrian of a behavior of the vehicle; and muting the virtual engine sound and the alarm sound when the vehicle travels at a speed which is equal to or greater than a second speed, wherein the alarm sound is output through a directional speaker mounted to a right side of the vehicle, and an emission range of the virtual engine sound and the alarm sound is adjusted according to regional sound field control.

The right-turn alarm sound may be a pattern sound having an emission angle of 60° tilted to a right side with respect to the forward direction of the vehicle.

The alarm sound may include a right-turn alarm sound configured to inform the pedestrian of a right-turn action of the vehicle; and a pedestrian alarm sound configured to inform the pedestrian of an approach of the vehicle.

The right-turn alarm sound may be generated when a combination lever switch of the vehicle moves to a right-turn direction and a steering wheel rotates to a right-turn angle.

The right-turn alarm sound may be generated when a navigation system of the vehicle displays a right-turn signaling message on a traveling route of the vehicle.

The alarm sounds may be generated to have different sound field patterns.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
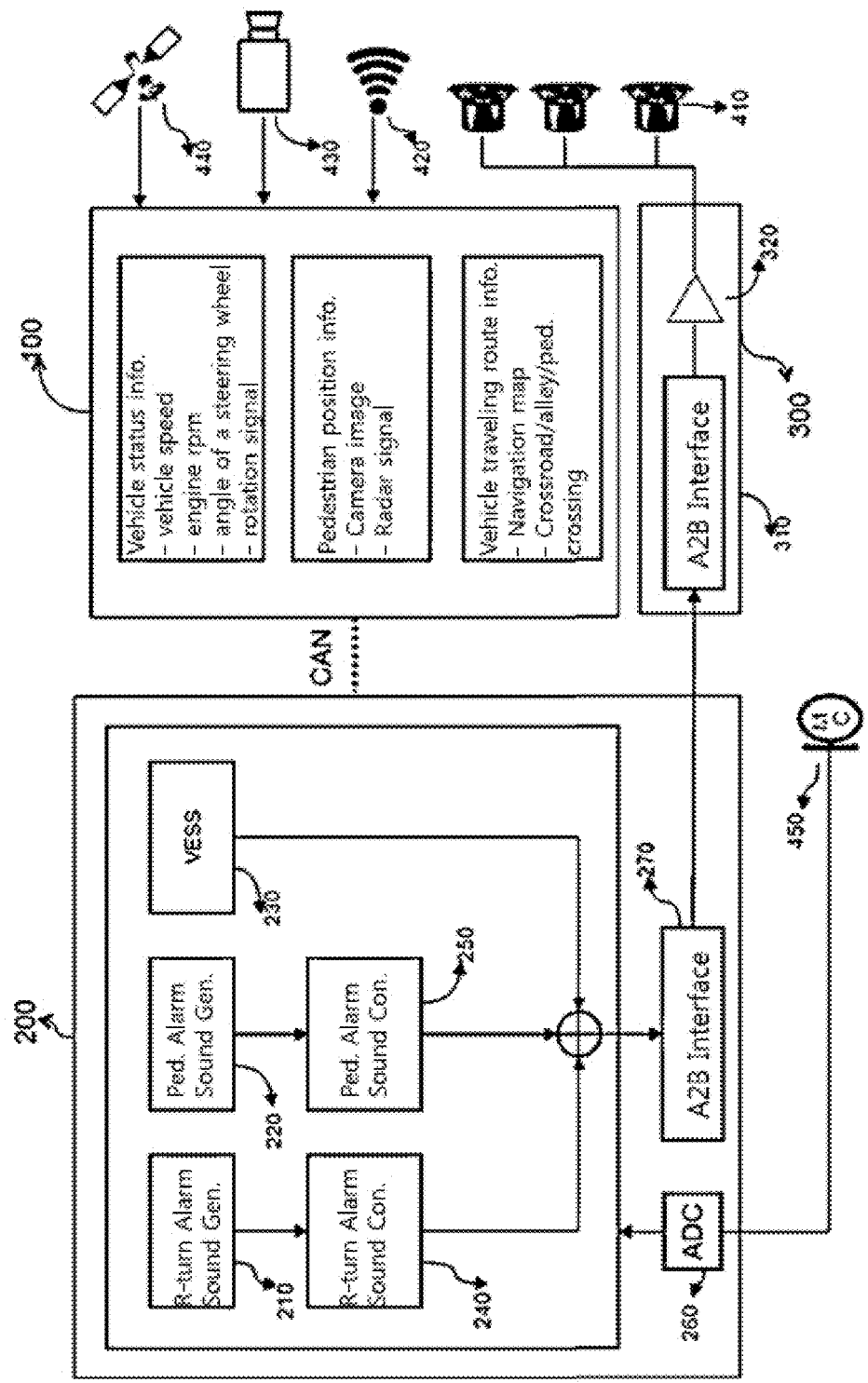
FIG. 1 is a diagram illustrating a pedestrian warning system for an eco-friendly vehicle according to an exemplary embodiment of the present invention.
Figure 2:
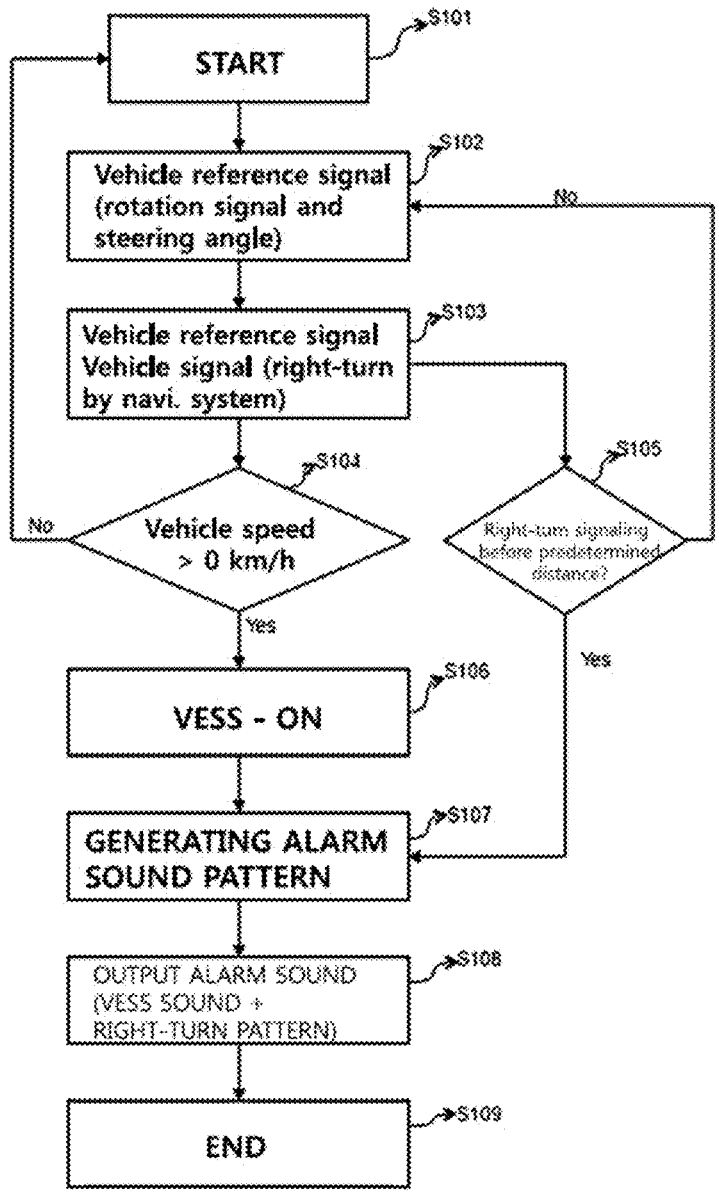
FIG. 2 is a flowchart illustrating a pedestrian warning method for an eco-friendly vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and the shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Parts that are not related to a description of the present invention are omitted in the drawings and like reference numerals denote the same components throughout the disclosure.

In the present application, the terms "including" or "having" are used to indicate that features, numbers, steps, operations, components, parts or combinations thereof described in the present embodiment are present and presence or addition of one or more other features, numbers, steps, operations, components, parts or combinations is not excluded.

It will be understood that when one element is referred to as being "connected to" or "coupled to" another element, one element may be "connected to" or "coupled to" another element via a further element although one element may be directly connected to or directly coupled to another element.

All terms used herein, including technical or scientific terms, have the same meanings as understood by those skilled in the art. Terms defined in a generally used dictionary may be analyzed to have the same meaning as the context of the relevant art and may not be analyzed to have ideal or excessively formal meanings unless clearly defined in the present application. The terminology used in an exemplary embodiment of the present invention is for describing various exemplary embodiments only and is not intended to limit the disclosure.

A pedestrian warning system and method for an eco-friendly vehicle according to exemplary embodiments of the present invention will hereinafter be described with reference to FIG. 1, FIG. 2, FIG. 3, and FIG. 4.

FIG. 1 is a diagram illustrating a pedestrian warning system for an eco-friendly vehicle according to an exemplary embodiment of the present invention.

Referring to FIG. 1, the pedestrian warning system for the eco-friendly vehicle includes a vehicle 100, a warning sound controller 200, and a warning sound output device 300.

For example, the vehicle 100 may receive Global Positioning System (GPS) information from a GPS satellite 440 through an in-vehicle navigation system. The navigation system may include a navigation map configured for providing a driver or a user with navigation route information related to the vehicle. The navigation map may include various road conditions, for example, a crossroad, an alley, a pedestrian crossing, etc. Furthermore, the vehicle 100 may monitor various states of peripheral regions of the vehicle through a camera detector 430, and may detect an object or entity approaching the vehicle through a radar detector 420. The vehicle 100 constantly provides vehicle status information (e.g., a vehicle speed, an engine rpm, a rotation angle of a steering wheel, and an indication of a rotation signal of a combination lever switch of the vehicle) such that the warning sound controller 200, to be described later, can refer to the above vehicle status information through Controller Area Network (CAN) communication.

The warning sound controller 200 may include a right-turn alarm sound generator 210 configured to generate a right-turn alarm sound when the vehicle turns right; a right-turn alarm sound controller 240 configured to control a right-turn alarm sound generated from the right-turn alarm sound generator 210; a pedestrian alarm sound generator 220 configured to generate an alarm sound for a pedestrian approaching either the vehicle or the front of the vehicle; a pedestrian alarm sound controller 250; and a virtual engine sound system (VESS) 230.

Furthermore, the pedestrian warning system for the eco-friendly vehicle according to the exemplary embodiment of the present invention may include an amplifier 320 configured to amplify the right-turn alarm sound, the pedestrian alarm sound, and the virtual engine sound; and a warning sound output device 300 including directional speakers 410.

Meanwhile, the warning sound controller 200 may further include an animal alarm sound controller for informing animals of the movement or behavior of the vehicle as necessary.

The warning sound controller 200 may include an Automotive Audio Bus (A2B) interface 270. The warning sound output device 300 may include an A2B interface 310. A2B may refer to a technology developed by Analogue Devices Company. In the case of using the A2B, a number of electric wires can be reduced.

The above-mentioned warning sound controller may be configured to generate the pedestrian alarm sound upon receiving pedestrian position information from the above-mentioned pedestrian position information collection device (for example, the camera detector 430 or the radar detector 420).

Figure 4A:
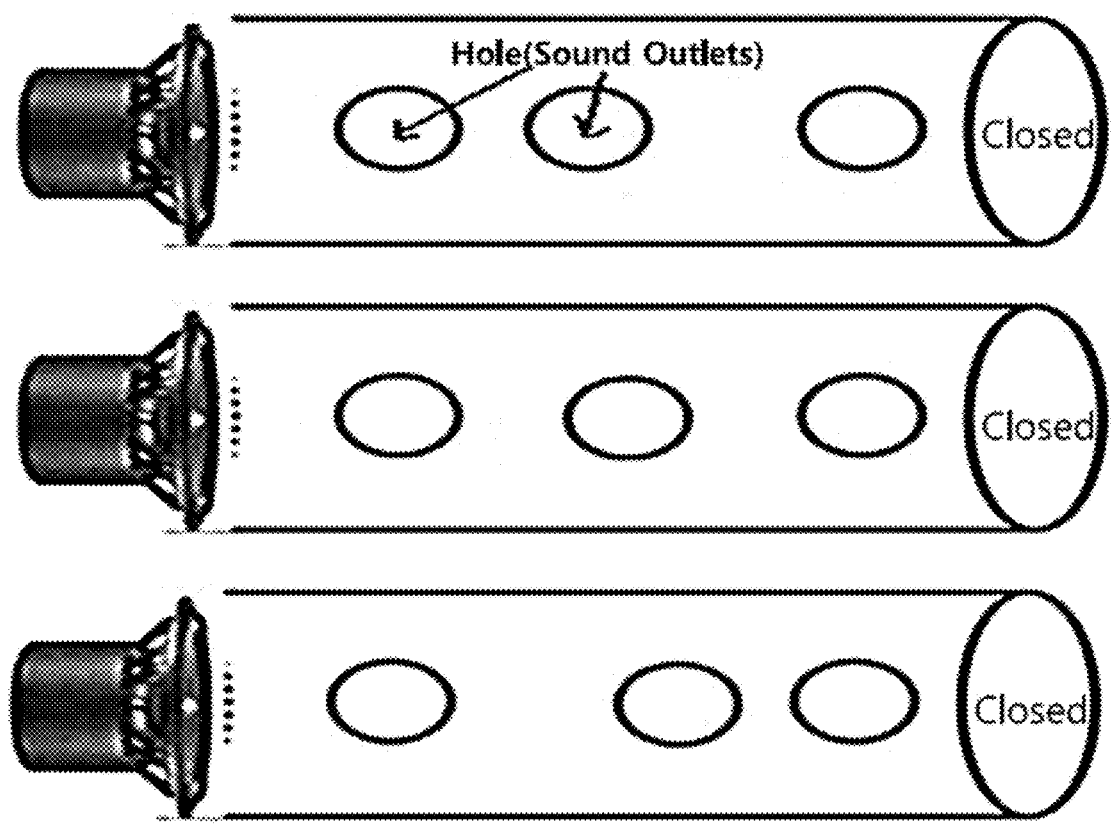
FIG. 4A is a view illustrating holes configured to form an alarm pattern of a three-speaker array used in an eco-friendly vehicle according to an exemplary embodiment of the present invention.

The directional speaker 410 according to the exemplary embodiment of the present invention includes 3 directional speakers, whereas the related art includes 6 speakers used in a conventional VESS. Each directional speaker 410 may include an induction tube, one end portion of which is closed, as shown in FIG. 4A. The induction tube includes a plurality of holes for controlling a sound field. The holes are punctured in different directions, and may be configured to generate various types of sounds in the same manner as in a wind instrument.

The exemplary embodiments of the present invention may use a sound field beam pattern technology, which detects the presence of a pedestrian (including animals), generates a warning sound according to various patterns, automatically determines a distance to the vehicle and a volume of the warning sound, and generates the resultant warning sound (alarm sound) only to a specific region or direction thereof The directional speaker 410 may receive various alarm sounds and virtual sound from the right-turn alarm sound controller 240, the pedestrian alarm sound controller 250, and the VESS 230, and may adjust an emission range of the virtual engine sound and the alarm sound according to sound field control technology.

Figure 3A:
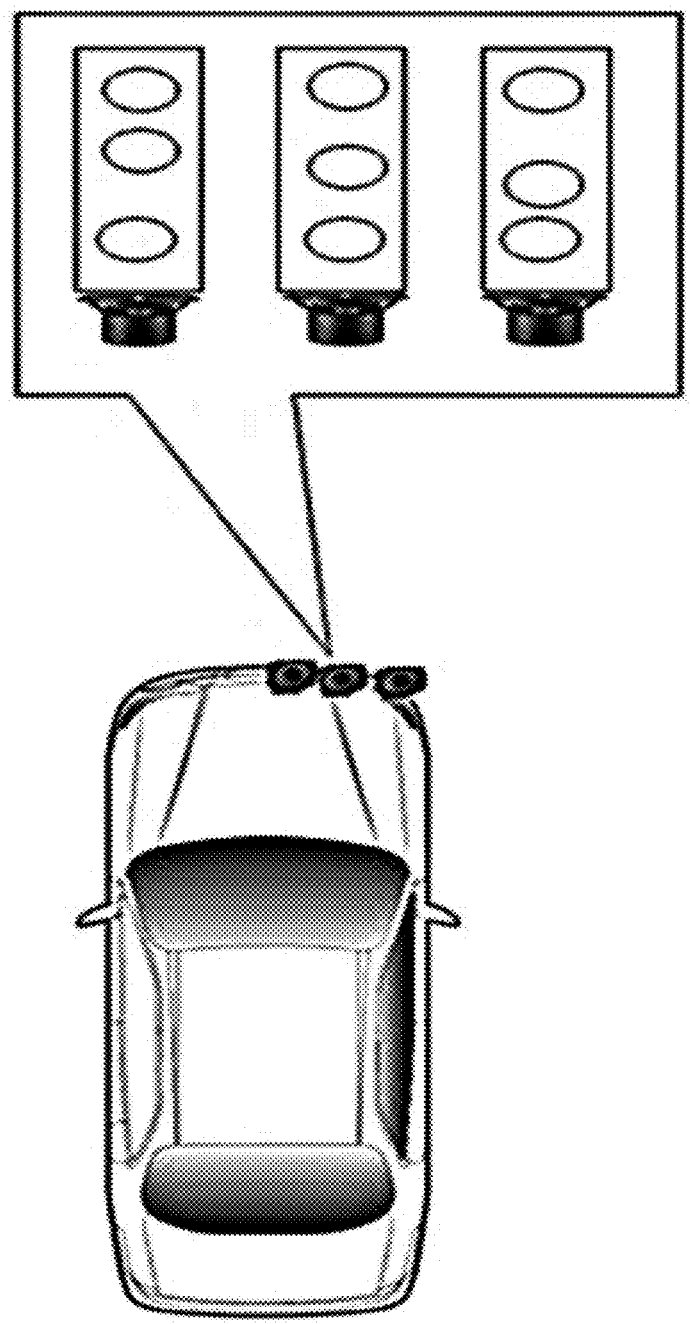
FIG. 3A is a view illustrating a speaker array for use in an eco-friendly vehicle according to an exemplary embodiment of the present invention.
Figure 3B:
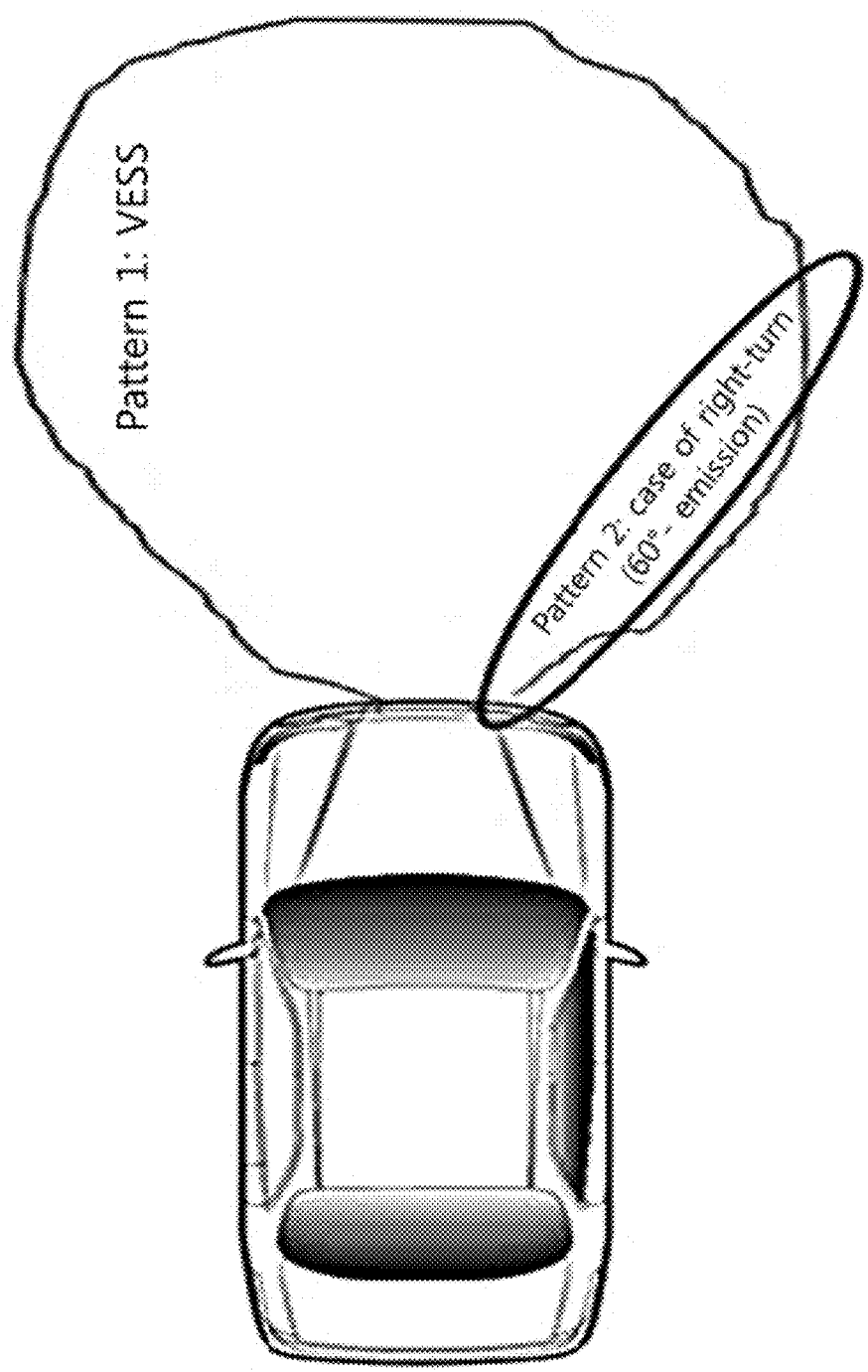
FIG. 3B is a conceptual diagram illustrating a method for controlling a sound field in a response to formation of a sound pattern caused by the speaker array of FIG. 3A.

For example, as shown in FIG. 3B, the warning sound controller 200 may output a virtual engine sound as a sound pattern, or may also output the pedestrian alarm sound toward the right side (at a right-directional angle). In more detail, at a vehicle speed in a VESS region (i.e., a region from 0 km/h to a predetermined speed including 30 km/h), the warning sound controller 200 may output the alarm sound using both a VESS function and a pedestrian alarm sound emission pattern. At a greater vehicle speed than 30 km/h, the warning sound controller 200 may turn OFF the VESS function and output the alarm sound using only the pedestrian alarm sound emission pattern.

Furthermore, the right-turn alarm sound and the pedestrian alarm sound may have different patterns. Furthermore, the warning sound controller 200 is used as a device configured for collecting noise signals generated from the outside of the vehicle. For example, the warning sound controller 200 may further include a microprocessor 450 and an analog-to-digital converter (ADC) 260 configured to convert the collected noise signals into a digital signal.

As described above, a pedestrian warning method using the above-mentioned pedestrian warning system for the eco-friendly vehicle according to the exemplary embodiments of the present invention will hereinafter be described with reference to the accompanying drawings.

The warning sound controller 200 may receive a kind of reference signal, for example, a vehicle speed, an engine rpm, etc. from the vehicle. Especially, some events, e.g., an event in step S102 and an event in step S103, may be used as the principal events configured for controlling the alarm sound. The event in step S102 may refer to a case in which the driver of the vehicle may manipulate the lever switch in the right-turn direction thereof, and the steering wheel may rotate to a predetermined right-turn angle such that the vehicle needs to turn right. The event in step S103 may refer to the other case in which the vehicle needs to turn right while moving on a navigation route supplied from a navigation system.

While the vehicle travels by referring to the vehicle reference signals, when the vehicle travels at a first speed or less (e.g., at 30 km/h or less) in step S104, the warning sound controller 200 may control the VESS 230 to output a virtual engine sound in step S106.

While the vehicle travels by referring to the vehicle reference signals, when the vehicle turns right, the warning sound controller 200 may generate a virtual engine sound, and at the same time may generate an alarm sound pattern which informs a pedestrian of the future behavior of the vehicle in step S107.

When using the above alarm sound pattern, at a vehicle speed of the VESS region (i.e., a region from 0 km/h to a predetermined speed (e.g., 10 km/h)), the VESS is turned ON and the pedestrian alarm sound emission pattern is used. When the vehicle travels at a speed greater than the vehicle speed of the VESS region (e.g., 10 to 30 km/h), the VESS is turned OFF and only the pedestrian alarm sound emission pattern is used. When the vehicle travels at a speed greater than a second speed (i.e., 30 km/h), the virtual engine sound and the alarm sound are not generated.

When the vehicle enters the range of a predetermined distance just before the navigation system of the vehicle displays a right-turn signaling message on a navigation route, the right-turn alarm sound is output in step S105.

Figure 4B:
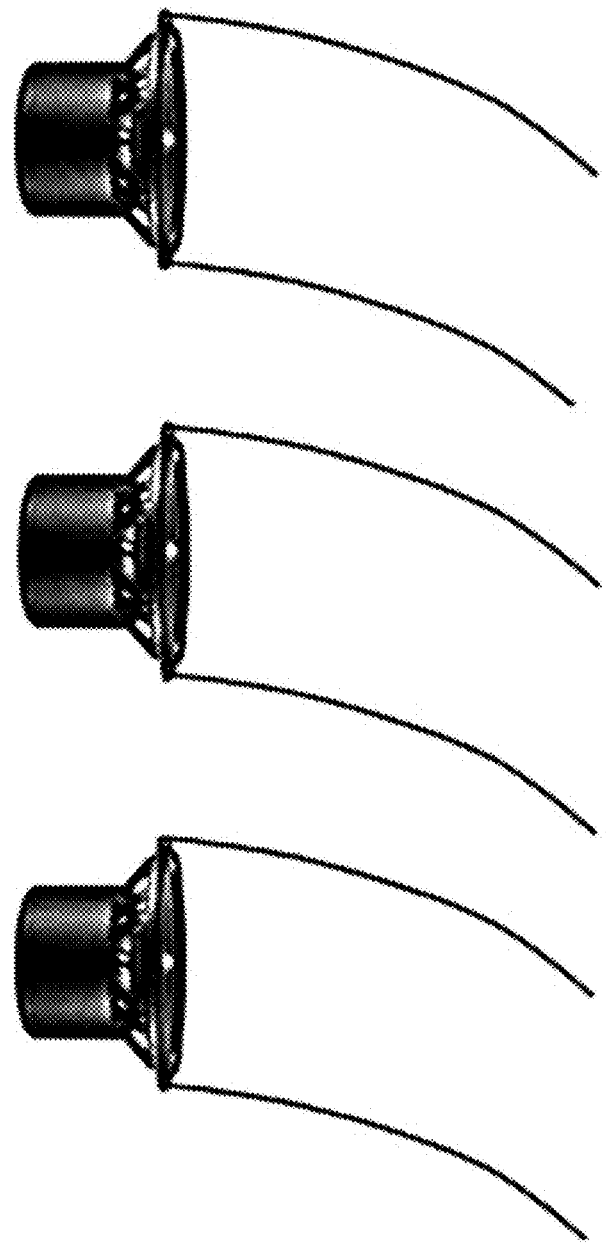
FIG. 4B is a view illustrating induction tubes for inducing directivity of a three-speaker array used in an eco-friendly vehicle according to an exemplary embodiment of the present invention.

The warning sound output device 300 for generating the above-mentioned alarm sound may further include at least one induction tube for guiding the output sound of the directional speakers in a specific direction thereof, as shown in FIG. 4B. For the way of example but not limitation, the specific direction may refer to the right direction thereof. However, the scope or spirit of the present invention is not limited thereto, and the specific direction may also refer to the left direction in the United Kingdom, Japan, and the like because vehicles in the United Kingdom or Japan drive on the left hand side, without departing from the scope or spirit of the present invention.

Figure 5:
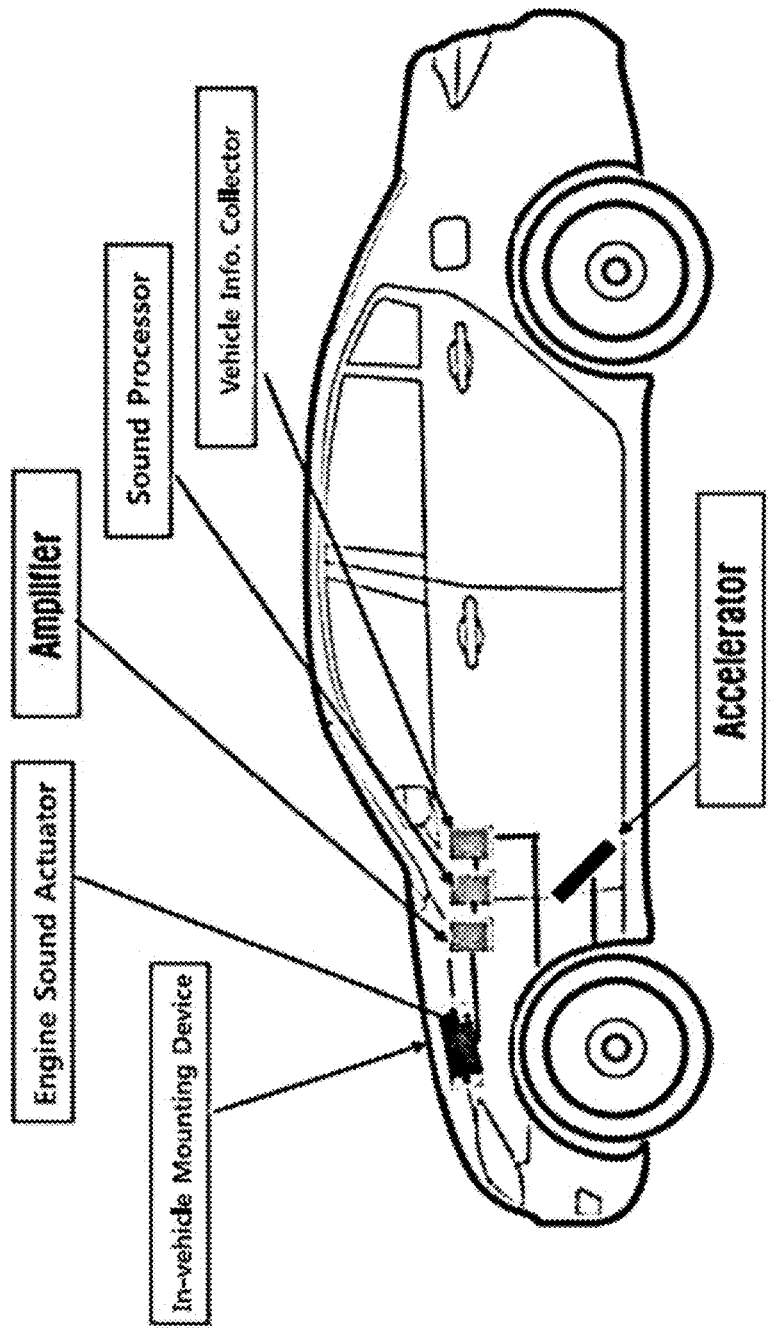
FIG. 5 shows a vehicle including an example of pedestrian warning system according to an exemplary embodiment of the present invention.

FIG. 5 shows a vehicle including an example of the pedestrian warning system.

As shown, the vehicle may include an engine sound actuator, an in-vehicle mounting device, an amplifier, a sound processor, a vehicle information collector, and an accelerator. Herein, the in-vehicle mounting device is configured for mounting an engine sound actuator on a vehicle frame or another component. The accelerator is a sort of device, typically a foot pedal, which controls a speed of a vehicle's motor. The engine sound actuator can generate an engine sound, regardless of whether an actual engine operates. For example, an electric vehicle does not have an engine which is a kind of machine with moving parts that converts power into motion based on fossil-fuel combustion.

The engine sound actuator can model the engine's sound in a response to the accelerator. The amplifier can be considered an electronic device configured for increasing the amplitude of electrical signals, used chiefly in sound reproduction. In the present example, the amplifier can increase the amplitude of sound delivered from the engine sound actuator. The sound processor can handle a digital sound signal to control the amplifier. The vehicle information collector can be communicated or engaged with at least one detector or camera disposed in the vehicle to collect a plurality of information (e.g., a driving condition or circumstance near the vehicle) and provide collected information to a vehicle controller, the sound processor or the engine sound actuator.

As is apparent from the above description, a pedestrian warning system and method for an eco-friendly vehicle according to the exemplary embodiments of the present invention can allow pedestrians located in the vicinity of a traveling road of a quiet eco-friendly vehicle to easily recognize the presence of the quiet eco-friendly vehicle.

The pedestrian warning system and method for an eco-friendly vehicle according to the exemplary embodiments of the present invention can provide a pedestrian with a warning signal for indicating that the eco-friendly vehicle will soon turn right soon such that the pedestrian can avoid collision with the vehicle, resulting in avoidance of traffic accidents.

Assuming that a VESS mandatory for the eco-friendly vehicle has to generate a loud sound, people may suffer from noise pollution. Therefore, the pedestrian warning system and method for the eco-friendly vehicle according to the exemplary embodiments of the present invention may detect the presence of a pedestrian and generate a warning sound toward a specific region or direction thereof, resulting in prevention of noise pollution on roads.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedestrian warning system for a vehicle comprising:
   a warning sound controller including an alarm sound controller and a virtual engine sound system configured to inform a pedestrian of a behavior of the vehicle; and
   an alarm sound output device including an amplifier for amplifying a pedestrian alarm sound and a virtual engine sound, and a directional speaker for outputting the amplified pedestrian alarm sound and the amplified virtual engine sound,
   wherein the directional speaker is mounted to a right side of the vehicle, and adjusts an emission pattern of the pedestrian alarm sound and the virtual engine sound to a directional angle according to regional sound field control, and wherein the pedestrian alarm sound and the virtual engine sound are a pattern sound having a right-directional angle.

2. The pedestrian warning system according to claim 1, wherein the alarm sound controller includes:
   a right-turn alarm sound controller configured to inform the pedestrian of a right-turn action of the vehicle; and
   a pedestrian alarm sound controller configured to inform the pedestrian of an approach of the vehicle.

3. The pedestrian warning system according to claim 1, wherein the right-turn alarm sound is a pattern sound having an emission angle of 60° tilted to a right side with respect to a front of the vehicle.

4. The pedestrian warning system according to claim 1, wherein the right-turn alarm sound is generated when a combination lever switch of the vehicle moves toward a right-turn direction and a steering wheel rotates to a right-turn angle.

5. The pedestrian warning system according to claim 1, wherein the right-turn alarm sound is generated when a navigation system of the vehicle displays a right-turn signaling message on a traveling route of the vehicle.

6. The pedestrian warning system according to claim 1, wherein
   the alarm sounds are generated to have different sound field patterns; and
   the directional speaker includes a plurality of speakers, wherein each speaker of the plurality of speakers includes a plurality of sound output holes distanced from one other according to different patterns.

7. The pedestrian warning system according to claim 1, wherein each of the alarm sound controller and a warning sound output device includes an Automotive Audio Bus (A2B) interface.

8. The pedestrian warning system according to claim 1, further comprising:
   a device configured to collect noise signals generated from outside of the vehicle; and
   an analog-to-digital converter (ADC) configured to convert the collected noise signals into a digital signal.

9. The pedestrian warning system according to claim 1, wherein a warning sound output device includes:
   an induction tube configured to guide an output sound of the directional speaker in a predetermined direction thereof.

* * * * *